US010986476B2

(12) United States Patent
Azevedo et al.

(10) Patent No.: US 10,986,476 B2
(45) Date of Patent: *Apr. 20, 2021

(54) SYSTEMS AND METHODS FOR EFFICIENTLY COLLECTING AND COMMUNICATING SENSOR DATA IN A NETWORK OF MOVING THINGS, FOR EXAMPLE INCLUDING A NETWORK OF AUTONOMOUS VEHICLES

(71) Applicant: Veniam, Inc., Mountain View, CA (US)

(72) Inventors: Joao Azevedo, Oporto (PT); Rui Costa, Sintra (PT); Roy Russell, Cambridge, MA (US)

(73) Assignee: Veniam, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,278

(22) Filed: Jan. 4, 2019

(65) Prior Publication Data

US 2019/0141472 A1 May 9, 2019

Related U.S. Application Data

(63) Continuation of application No. 15/213,269, filed on Jul. 18, 2016, now Pat. No. 10,194,264.

(60) Provisional application No. 62/222,135, filed on Sep. 22, 2015.

(51) Int. Cl.
*H04W 4/38* (2018.01)
*H04W 40/00* (2009.01)
*H04W 4/70* (2018.01)
*H04L 29/08* (2006.01)
*H04W 4/02* (2018.01)

(52) U.S. Cl.
CPC ............. *H04W 4/38* (2018.02); *H04W 4/70* (2018.02); *H04W 40/00* (2013.01); *H04L 67/10* (2013.01); *H04W 4/02* (2013.01); *Y02D 30/70* (2020.08)

(58) Field of Classification Search
CPC ........ H04L 67/10; H04W 40/00; H04W 4/38; H04W 4/70; Y02D 70/1262; Y02D 70/142; Y02D 70/144; Y02D 70/164; Y02D 70/22; Y02D 70/26
See application file for complete search history.

(56) References Cited

U.S. PATENT DOCUMENTS

| 2005/0057370 | A1* | 3/2005 | Warrior .............. H04B 7/18506 340/870.01 |
| 2008/0129475 | A1 | 6/2008 | Breed et al. |
| 2009/0222541 | A1 | 9/2009 | Monga et al. |
| 2011/0183685 | A1 | 7/2011 | Burton et al. |
| 2014/0162638 | A1 | 6/2014 | Holostov et al. |

(Continued)

OTHER PUBLICATIONS

International Search Report, PCT/US2016/052915 dated Dec. 15, 2016, 2 pages.

*Primary Examiner* — Erica Navar
(74) *Attorney, Agent, or Firm* — McAndrews, Held & Malloy, Ltd.

(57) ABSTRACT

Systems and methods for collecting data in a network of moving things. As non-limiting examples, various aspects of this disclosure provide systems and methods for operating sensor systems and collecting data from sensor systems in a power-efficient and network-efficient manner.

16 Claims, 13 Drawing Sheets

(56) References Cited

U.S. PATENT DOCUMENTS

| | | | |
|---|---|---|---|
| 2014/0192722 A1* | 7/2014 | Krause | H04L 29/08072 |
| | | | 370/328 |
| 2015/0172863 A1 | 6/2015 | Brachet et al. | |
| 2015/0264554 A1* | 9/2015 | Addepalli | H04W 52/0264 |
| | | | 370/328 |
| 2019/0090174 A1 | 3/2019 | Rocci et al. | |

* cited by examiner

SYSTEMS AND METHODS FOR EFFICIENTLY COLLECTING AND COMMUNICATING SENSOR DATA IN A NETWORK OF MOVING THINGS, FOR EXAMPLE INCLUDING A NETWORK OF AUTONOMOUS VEHICLES

CROSS-REFERENCE TO RELATED APPLICATIONS/INCORPORATION BY REFERENCE

The present application is a continuation of U.S. patent application Ser. No. 15/213,269, filed on Jul. 18, 2016, and titled "Systems and Methods for Collecting Sensor Data in a Network of Moving Things," which makes reference to, claims priority to, and claims benefit from U.S. Provisional Patent Application Ser. No. 62/222,135, filed on Sep. 22, 2015, and titled "Systems and Methods for Collecting Sensor Data in a Network of Moving Things," each of which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving Mobile and static nodes. As a non-limiting example, current communication networks are unable to adequately support a network comprising a complex array of both moving and static nodes (e.g., the Internet of moving things). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
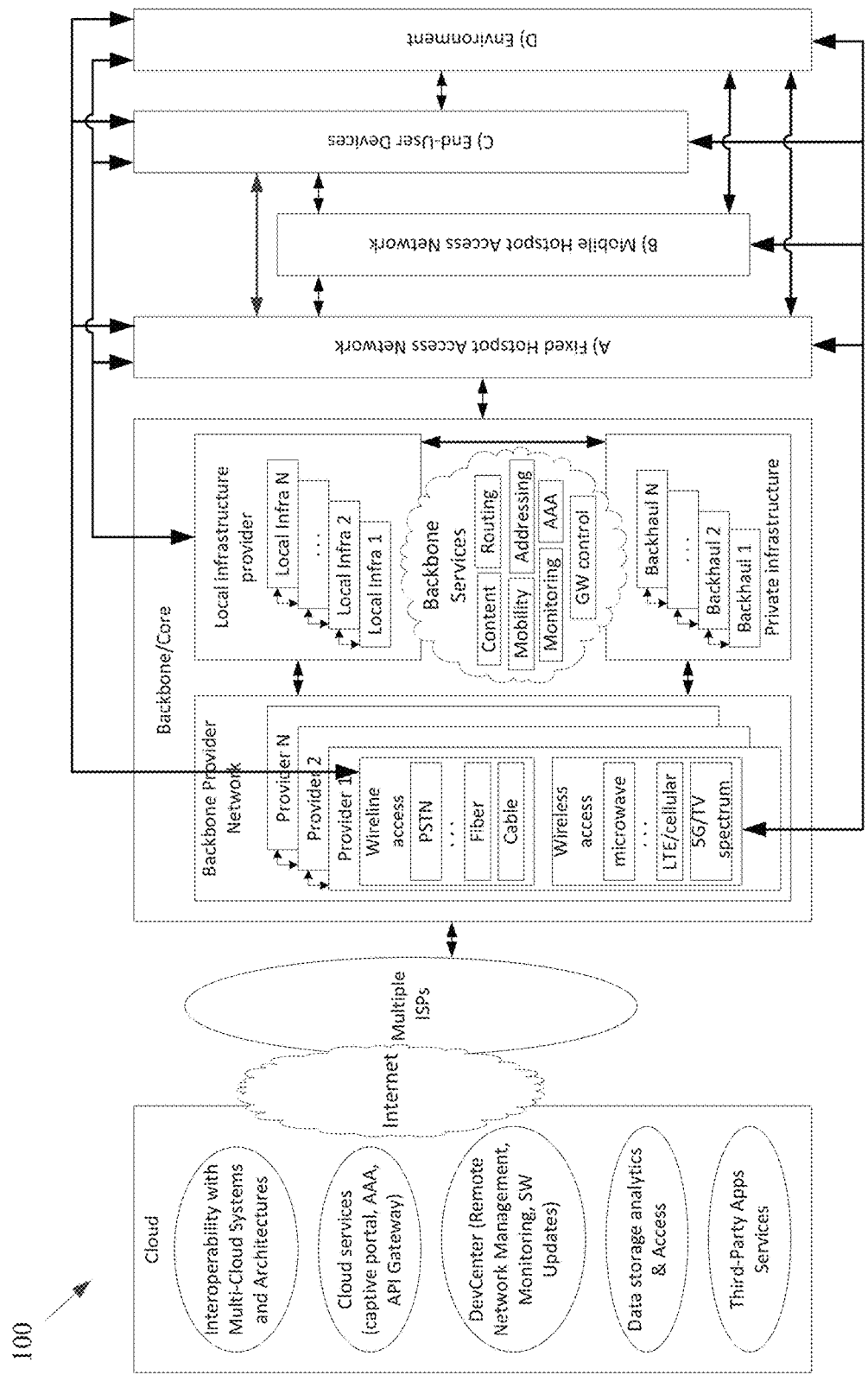
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set $\{(x), (y), (x, y)\}$. That is, "x and/or y" means "one or both of x and y." As another example, "x, y, and/or z" means any element of the seven-element set $\{(x), (y), (z), (x, y), (x, z), (y, z), (x, y, z)\}$. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, Mobile Access Points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, Fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10x the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a Mobile Access Point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that Fixed Access Points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or Fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, 600, 700, 800, 900, 1100 and 1200, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
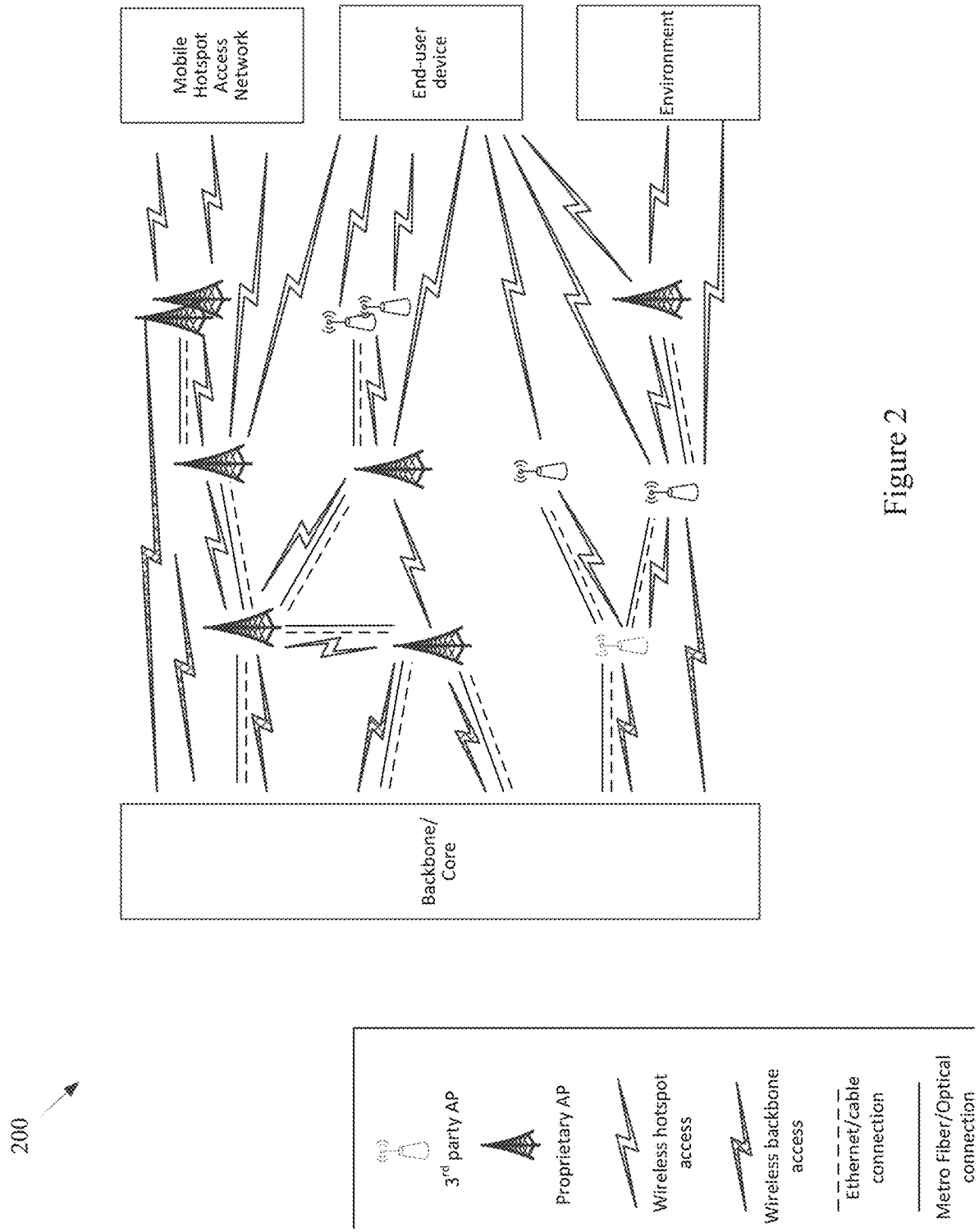
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, 600, 700, 800, 900, 1000, 1100, and 1200, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
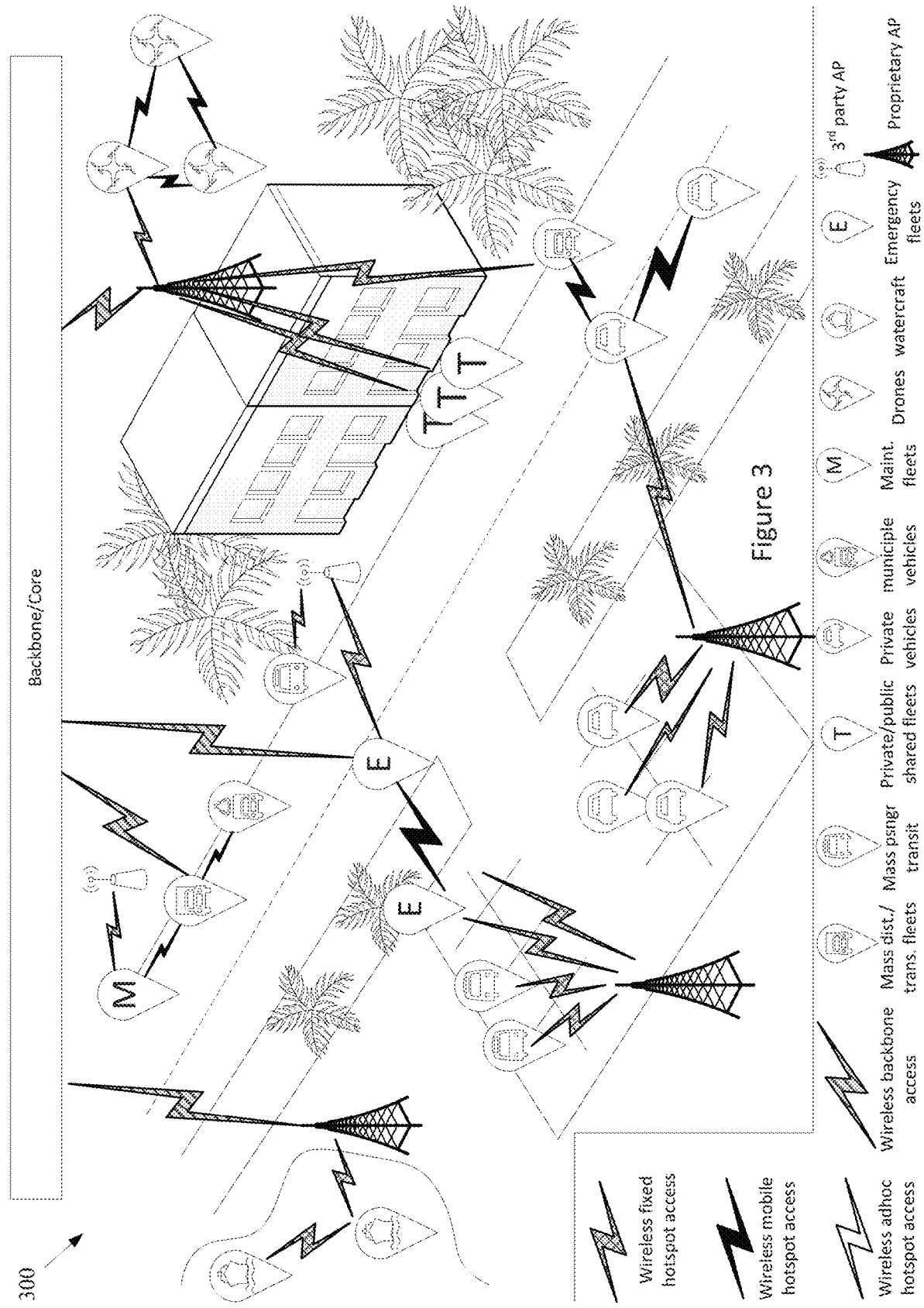
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, 600, 700, 800, 900, 1000, 1100, and 1200, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
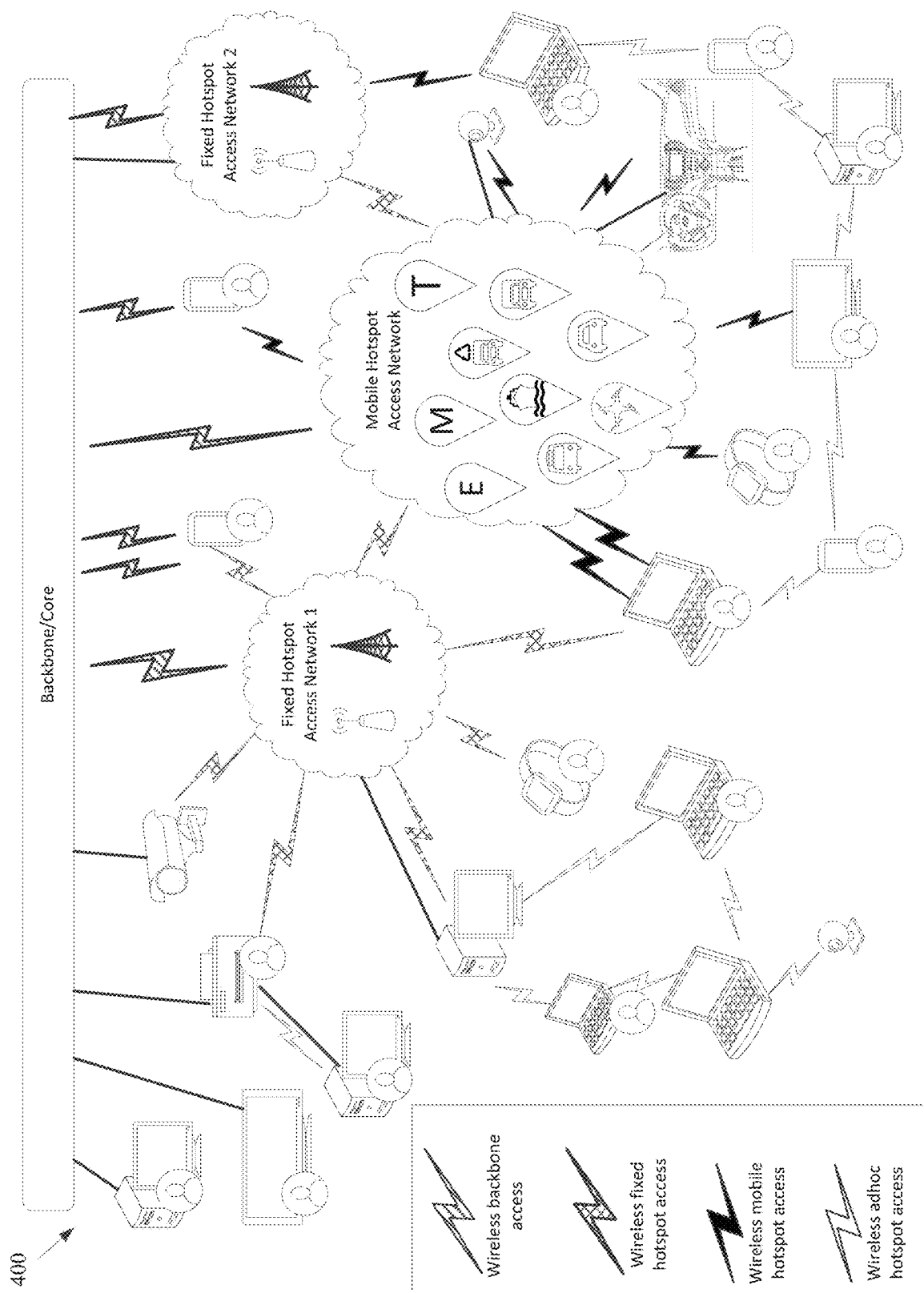
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, 600, 700, 800, 900, 1000, 1100, and 1200, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
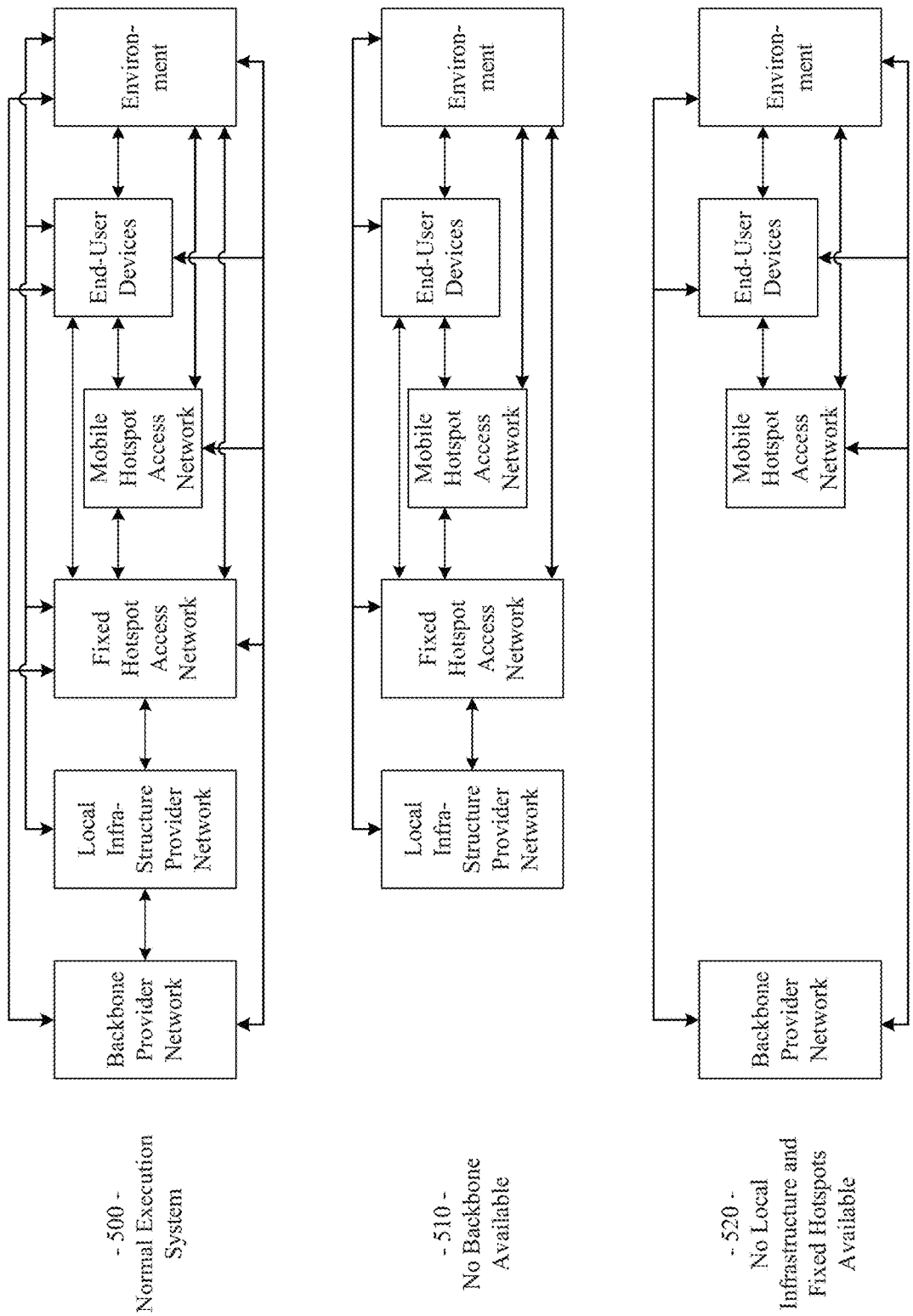
FIGS. 5A-5C show a plurality of network configurations illustrating the flexibility and/or and resiliency of a communication network, in accordance with various aspects of this disclosure.
Figure 5B:
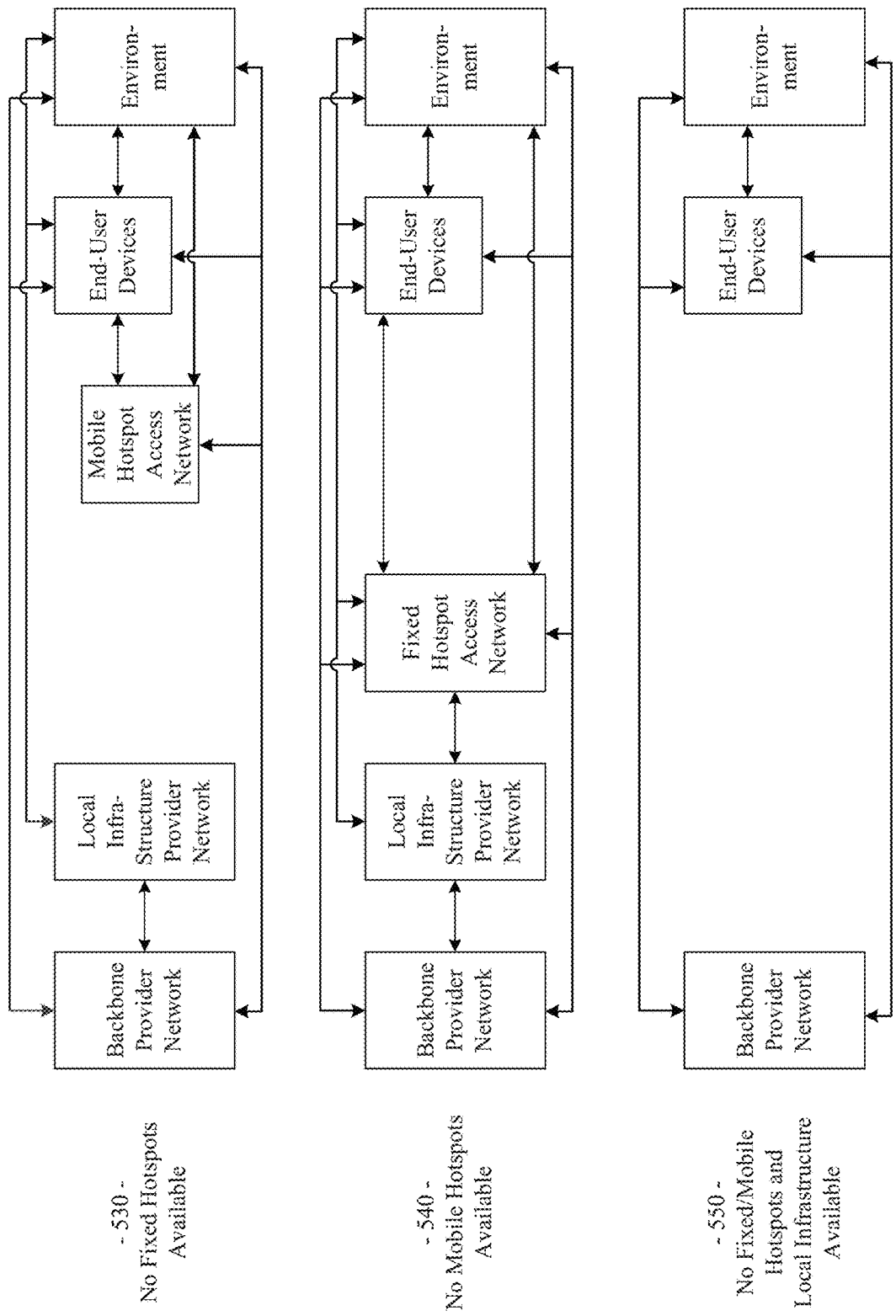
Figure 5C:
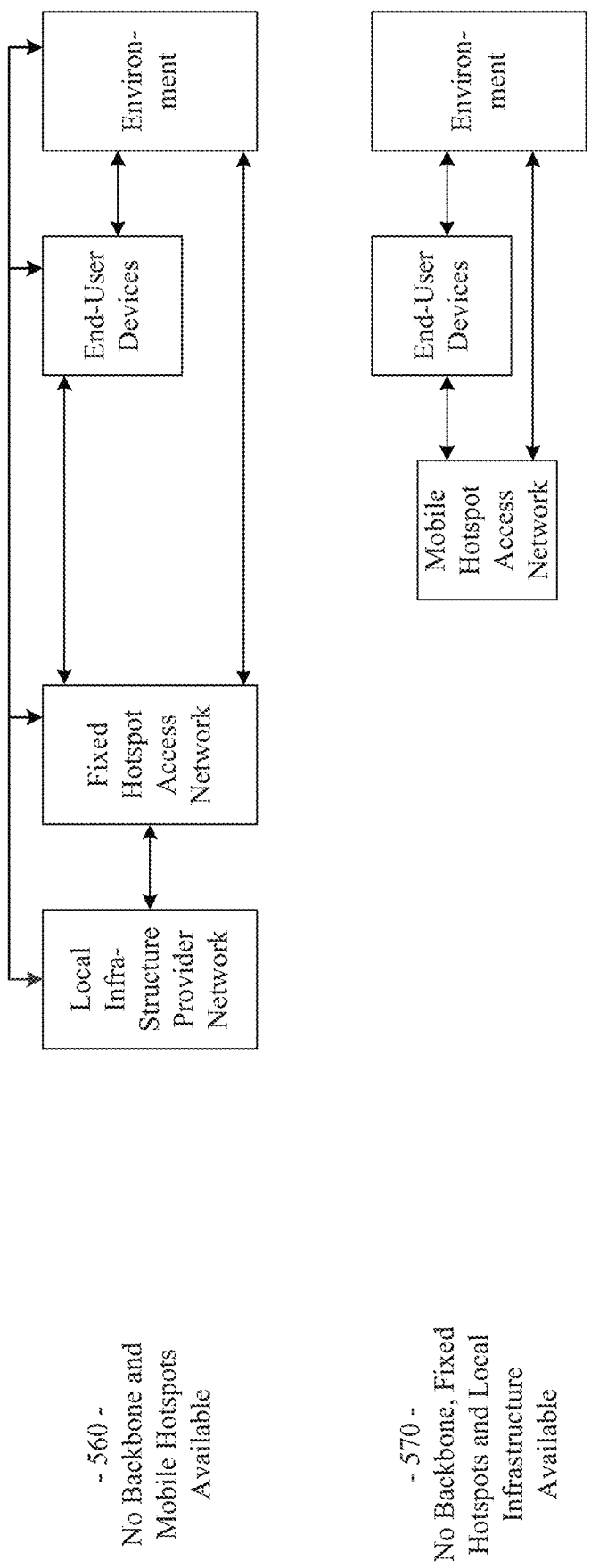

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, 600, 700, 800, 900, 1000, 1100, and 1200, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the Fixed Access Point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
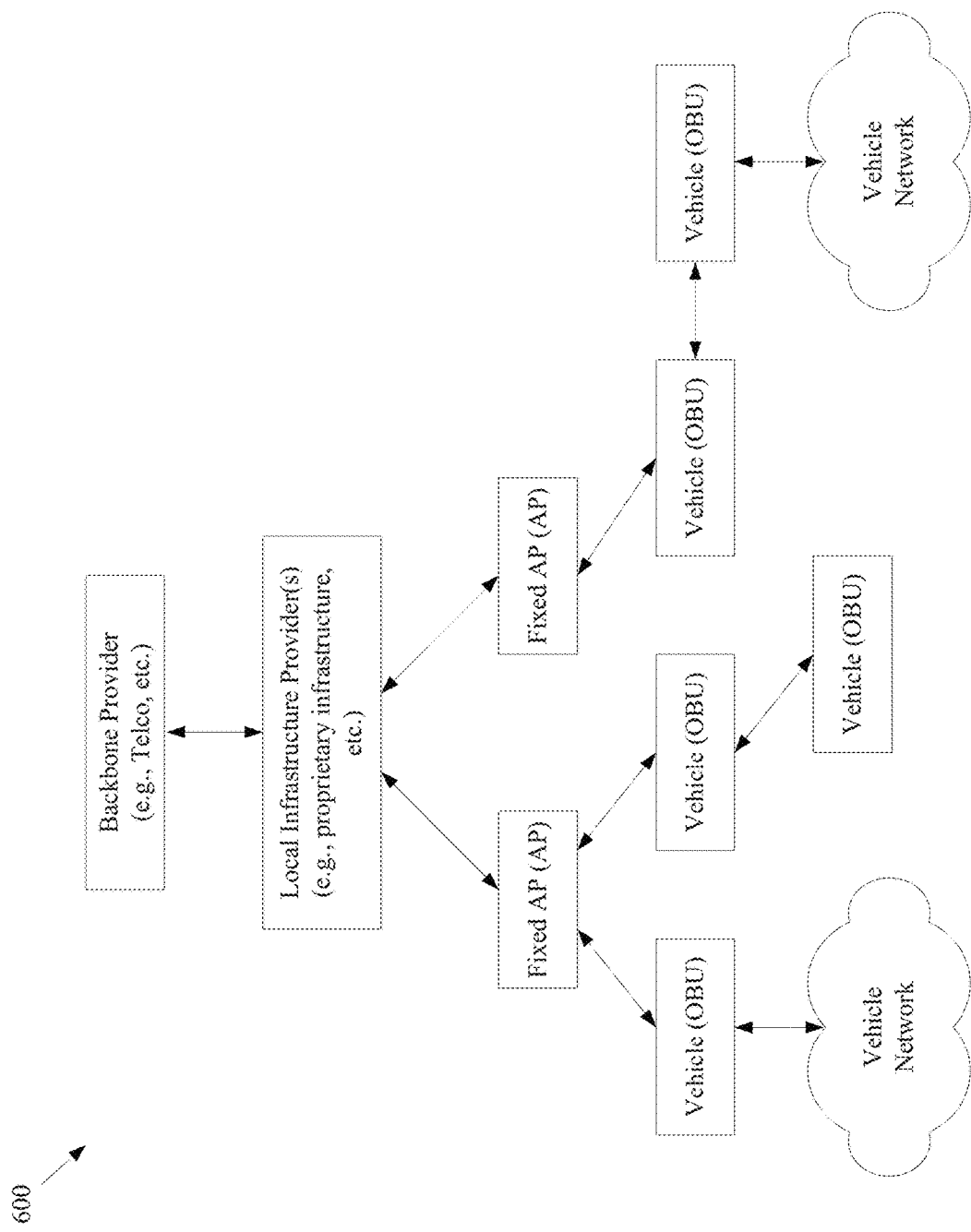
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, 500-570, 700, 800, 900, 1000, 1100, and 1200, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Sensors can economically measure a large variety parameters, for example from environmental conditions like temperature, humidity, barometric pressure, insulation, noise, pollution levels, gas, particles, rain, etc., to the behavior of people and objects. Deploying sensors can however be expensive, particularly when they require a fixed connection to a power source and/or a wired link for communication. The cost of sensor deployment may, for example, be considerably lower when the sensors are battery or solar powered, use other means of harvesting power from their environment, and/or when the sensors use wireless links to communicate the data being collecting.

To efficiently collect data from sensors and transport the collected data to the Cloud (e.g., a computing system or server thereof), a communication network in accordance with various aspects of the present disclosure (e.g., a network or Internet of Moving Things) may be utilized as a communication backbone. For example, in an example implementation, a vehicle equipped with a Mobile Access Point (MAP), which may also be referred to herein as an OBU, may communicate with a sensor as the vehicle passes nearby. Collected sensor data may then, for example, be stored, processed, and/or made available to/from the Cloud (e.g., via APIs or other interfaces).

In accordance with various aspects of the present disclosure, systems and methods are provided that utilize a Mobile Access Point to gather (or harvest) data from sensors. Various aspects provide for waking sensors from a low-power (or sleep) state utilizing various techniques (e.g., utilizing low power wireless beacons, acoustic beacons, accelerometer signals from on-board sensors, etc.) and quickly returning the sensors to the low-power state, for example resulting in a low duty cycle for various circuitry of the sensors and thus low power consumption.

Various aspects of this disclosure provide for cooperation among APs (e.g., Mobile APs, Fixed AP, etc.) and sensors to optimize the data collection in various ways (e.g., maximizing throughput, minimizing latency, maximizing reliability, adjusting the data collection parameters such as resolution/QoS rules/sample interval, utilizing geographical information for sensor data collection planning, minimizing unnecessary redundancy in data collecting, etc.). Such data collection may, for example, be adjusted dynamically in response to various conditions (e.g., weather, time-of-day, day-of-year, external events, security issues, emergency conditions, client and/or operator directives, etc.).

A communication network, in accordance with various aspects of the present disclosure, may then transport the collected sensor data to the Cloud (e.g., to a computing system or server thereof, etc.) or any other node in various ways (e.g., utilizing any of a variety of communication technologies or protocols, utilizing any of a variety of pathways through the network, utilizing delay-tolerant networking, utilizing opportunistic uploads for example via Wi-Fi networks, communicating in accordance with various QoS rules, etc.).

In an example implementation, each Mobile AP may broadcast its availability as the Mobile AP moves around, for example transmitting a signal. Such a signal may, for example, be referred to herein as a beacon signal, a trigger signal, a wake signal, etc. A sensor listening for these broadcasts may then communicate with the Mobile AP when it is within communication range, exchanging information (e.g., sensed data from the sensor, sensor control information to the sensor, sensor status information from the sensor, etc.). Each sensor may, for example, be equipped with a power-save component (e.g., a hardware circuit, a low-power processor circuit executing software instructions stored on a non-transitory medium, etc.) to wake the sensor whenever it may be able to communicate with a nearby Mobile AP and/or whenever it has data to communicate with a nearby Mobile AP.

In an example implementation, an example power-save component may comprise a low-power RF receiver (e.g., an RF receiver that works on a relatively low frequency (e.g., 900 MHz, etc.), on a frequency outside of typical Wi-Fi bands or other bands associated with other respective communication protocols being utilized to communicate data, etc.) that is electrically connected to the higher-power sensor circuitry (e.g., Wi-Fi communication circuitry, processor circuitry, various sensors, etc.). As a Mobile AP travels, it can send signals (e.g., beacon signals, wake signals, trigger signals, etc.) on the frequency of the RF receiver, which when received by the low-power RF receiver, causes the sensor to wake. The sensor circuit (e.g., comprising one or more sensors) may then perform its sensing, if it has not already done so, connect to the Mobile AP (e.g., via a Wi-Fi link or other technology), and communicate the sensor data to the Mobile AP. Note that the sensor may also wake just enough circuitry to make its own determination as to whether the sensor has sensor data to communicate, at which point additional circuitry may be awakened to perform such communication.

The Mobile AP (or also a Fixed AP, etc.) may, for example, broadcast the signal (e.g., beacon signal, trigger signal, wake signal, etc.) to generally wake or trigger any sensor (or other device) that receives the signal. Also for example, the Mobile AP may multi-cast the signal, for example forming the signal comprising characteristics (e.g., a multicast or group address, a code unique to the group of sensors, etc.) that when received by a sensor of a particular group of sensors, cause the sensor to wake. Additionally for example, the Mobile AP may unicast the signal to wake or trigger a specific sensor, for example forming the wake signal comprising characteristics (e.g., an individual network address, a code or other signal characteristic unique to the individual sensor, etc.) that identify the specific sensor. In an example scenario, the signal may comprise characteristics designed to wake or trigger all relevant sensors along the Mobile AP's (or vehicle's) route during a particular day or shift, during the Mobile AP's (or vehicle's) travels in a particular geographical region, etc.

It should be understood that, although various aspects of this disclosure present a signal that is utilized to wake a sensor from a power-save mode, the so-called wake signal need not wake the sensor (e.g., if the sensor is not sleeping). For example, the wake signal may in various scenarios merely serve as an indication to the sensor that a Mobile AP is in-range, and thus trigger sensing and/or communication activity of the sensor. Accordingly, such signals may be referred to as beacon signals, trigger signals, wake signals, etc.

The waking (or triggering) of the sensor may, for example, be configurable (e.g., locally configurable at the sensor, configurable by an AP (e.g., by a Mobile AP, Fixed AP, etc.), configurable by an application executing in the Cloud and communicating with the sensor via one or more APs, etc.). For example, a sensor may be configured to sense and/or wake a set number of times per day, for a particular duration, etc. Additionally, the Mobile AP can control whether the Mobile AP will send the wake signal, for example based on the expected time or location at which the Mobile AP is in the range of the sensor. Also, the sensor may autonomously decide when it will wake-up, for example based on the information it has to send, based on any of a variety of sensed conditions, etc.

In an example implementation, the sensor system (or circuit) may comprise an accelerometer (or other sensor). Whenever the accelerometer (which may be attached to or housed with other sensor circuitry) is moved, the accelerometer may send a signal to wake various circuitry of the sensor. In an example scenario, such an implementation may be utilized in a garbage collection bin which may cause the sensor to wake each time the bin is emptied, each time garbage is placed in the bin, etc., for example causing the sensor to sense, record, and/or report how full the bin is.

In an example implementation, sensor waking and/or sensor data gathering may be coordinated between a plurality of APs (e.g., between a plurality of Mobile APs and/or Fixed APs, etc.). Such coordination may, for example, be performed at the Cloud level, but may also be performed at other levels of the network, for example at the Mobile AP level. For example, Mobile APs may communicate with each other to determine whether to wake a particular sensor. For example if a Mobile AP, or for example two Mobile APs for redundancy purposes, has already collected the desired data from a sensor, the Mobile AP may inform other Mobile APs of the collection, so that the other Mobile APs do not waste the power, processing cycles, circuit lifetime, etc., of the sensor (and/or the other Mobile APs) by unnecessarily interfacing with the sensor. As stated herein, such coordination may be performed in the Cloud (e.g., at a networked computing system associated with sensor data gathering, etc.), at a Network Controller (NC), at a Fixed AP or plurality thereof, distributed among a fleet of Mobile APs, etc.

Figure 7:
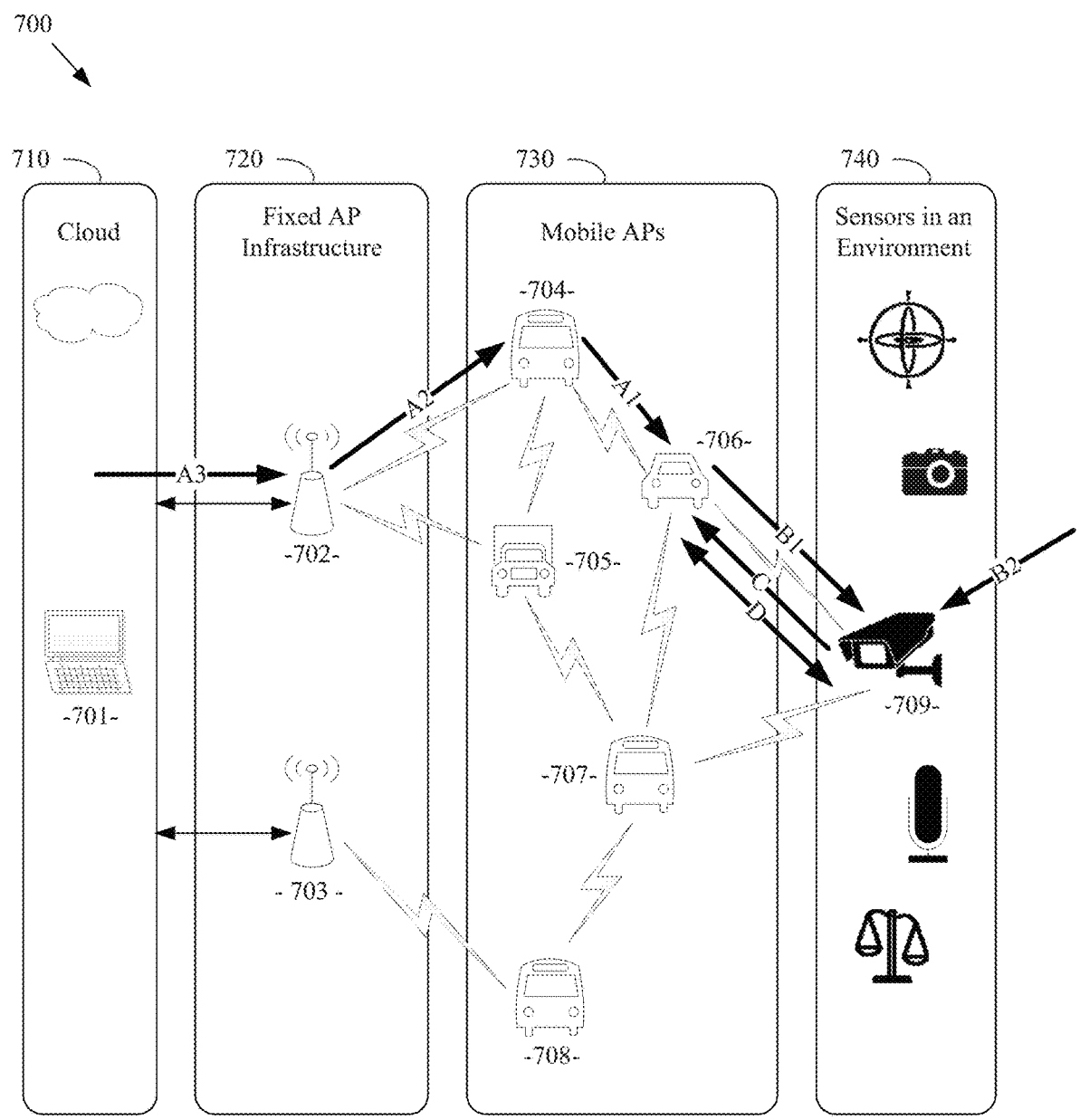
FIG. 7 shows a block diagram of an example communication network, in accordance with various aspects of the present disclosure.

An example scenario is shown in FIG. 7, which shows a block diagram of an example communication network, in accordance with various aspects of the present disclosure. The example network 700 may, for example, share any or all characteristics with the other example networks and/or network components 100, 200, 300, 400, 500-570, 600, 800, 900, 1000, 1100, and 1200, discussed herein. The following discussion presents an overview of example management functions performed by the various network elements at each stage of the example scenario shown in FIG. 7.

Example Step A generally concerns the knowledge of sensors nearby an AP. The Cloud 710 (or a networked computing system or server 701 thereof) may, for example, advertise to APs (e.g., Fixed APs, Mobile APs, etc.) in the neighborhood or vicinity of sensors that may have data to send. Such advertising may, for example, comprise propagating a list of sensors, communicating information regarding single sensors individually, etc. Such advertising is denoted graphically in FIG. 7 at arrow A3, which shows the flow of sensor information from the Cloud 710 to a Fixed AP 702 of the Fixed AP infrastructure 720. Such communication may, for example, occur through a wired and/or wireless infrastructure. Note that such sensor information may also flow to the Fixed AP 703 and/or to any other AP (e.g., all APs within a particular geographical distance of the sensor 709). Note that other Fixed APs (e.g., Fixed AP 703, etc.) may also receive the advertising.

The Fixed AP 702 may then, for example, advertise to Mobile APs in the neighborhood of sensors that may have data to send. Such advertising is denoted graphically in FIG. 7 at arrow A2, which shows the flow of sensor information from the Fixed AP 702 to a Mobile AP 704 of the set of Mobile APs 730. Such communication may, for example, occur through a wireless communication link (e.g., a DSRC link, etc.). Note that such sensor information may also flow to any one or more of the other Mobile APs 705, 706, 707, and 708. In an example, scenario, the advertising may be performed initially when a Mobile AP enters the general coverage area of a Fixed AP, and then continue, for example as sensor information is updated.

The Mobile AP 704 may then act on the received sensor information and/or advertise to one or more other Mobile APs in the neighborhood of sensors that have data to send. Such advertising is denoted graphically in FIG. 7 at arrow A1, which shows the flow of sensor information from the Mobile AP 704 to the Mobile AP 706. Such communication may, for example, occur through a wireless communication link (e.g., a DSRC link, etc.). Note that such sensor information may also flow to any of the other Mobile APs. In the example scenario of FIG. 7, Mobile AP 706 may be able to connect with the sensor 709. For example, the Mobile AP 706 may operate in accordance with a communication protocol that is also utilized by the sensor 709, the Mobile AP 706 may be authorized to communicate with the sensor 709, the Mobile AP 706 may be within RF range of the sensor 709, etc. Note that all Mobile APs operating near a particular sensor need be authorized to communicate with a particular sensor. Note also that the Mobile AP 706 may receive inputs from any of the other nodes of the network 700 (e.g., any of nodes 701-706 and 707-708) from which the Mobile AP 706 may determine whether to wake (or trigger) the sensor 709. For example, the Mobile AP 706 may receive a signal from another node of the network 700 indicating that sensor data has already been collected from a particular sensor and need not be collected again (or should be collected only one more time for redundancy purposes, etc.).

The Mobile AP 706 may then, for example, transmit a signal, which as explained herein may be referred to as a beacon signal or a trigger signal or a wake signal, to cause the sensor 709 to act. In an example scenario, the signal may comprise signal characteristics that cause the sensor 709 to wake from a lower-power (or sleep) mode. The transmission of the trigger signal is shown in FIG. 7 at arrow B1. The Mobile AP 706 may, for example, also determine whether the transmission of such a signal is necessary. For example, the sensor 709 may already be awake and need only hear a general-purposes beacon (e.g., a generic Wi-Fi beacon) from the Mobile AP 706 to trigger the sensor 709, and/or the sensor 709 may be of a type that wakes (or activates) in response only to an internal sensor (e.g., a motion sensor, accelerometer, gyroscope, shock sensor, noise sensor, moisture sensor, a user command, etc.) or timer. Various examples of such AP and/or sensor operation are provided herein, for example at FIGS. 8-12, and the discussions thereof.

The sensor 709, as discussed herein, may wake (or trigger activity) in response to any of a variety of stimuli. For example, the sensor 709 may wake (or trigger sensing and/or communication activity) in response to an RF signal from the Mobile AP 706 (e.g., as indicated by arrow B1 in FIG. 7) or in response to any of a variety of other stimuli (e.g., as indicated by arrow B2 in FIG. 7), for example in response to a timer, in response to a signal from any of the sensors discussed herein, any combination thereof, etc. Various examples of such sensor operation are provided herein, for example at FIGS. 8-12 and the discussions thereof.

The sensor 709 may, for example in response to a triggering signal or detected condition, perform a sensor measurement of its environment (if not already performed), establish a communication link with the Mobile AP 706, and communicate data regarding the sensor measurement (or a plurality thereof) with the Mobile AP 706. The sensor 709 may, for example, perform sensing in response to the received signal from the Mobile AP 706 and/or may have already performed sensing, the results of which need to be reported to the Mobile AP 706. The sensor 709 sensing, and connecting to and transferring the sensed data to the Mobile AP 706 are indicated graphically in FIG. 7 by arrows C and D.

The sensor 709 may communicate the sensor data to the Mobile AP 706 utilizing any of a variety of communication protocols. For example, the sensor 709 may utilize a low-power communication protocol (e.g., a modified Constrained Application Protocol (CoAP), etc.) to communicate the sensor data to the Mobile AP 706. Note that the Mobile AP 706 (or another node through the Mobile AP 706) may define various aspects of the sensor 709 sensing and/or communicating activity. For example, the Mobile AP 706 may specify (or define) an amount of bandwidth available to the sensor for communicate, specify a data resolution and/or sampling rate, specify conditions under which the sensor is to wake or sleep, etc.

After sensing (if performed) and communicating the sensor data to the Mobile AP 706, the sensor 709 may re-enter a sleep mode (if previously operating in a sleep mode). For example, while operating in the sleep mode (or low-power mode), the sensor might only wake for particular events or stimuli (e.g., triggering or wake signals, sensor stimuli, etc.).

As shown in FIG. 7, the sensor data from the sensor 709 may be gathered by any of a number of Mobile APs 730. For example, the Mobile AP 707 is shown to be within wireless communication range of the sensor 709. Also shown in FIG. 7 are a plurality of communication pathways via which the sensor data may be communicated through the vehicle communication network 700 from the sensor 709 to a computing system 701 of the Cloud 710. For example, the Mobile AP 706 may collect sensor data from the sensor 709 and communicate such sensor data to the Cloud 710 via the Mobile AP 704 and Fixed AP 702. Also for example, the Mobile AP 706 may communicate the collected sensor data to the Cloud 710 through the Mobile AP 707, Mobile AP 705, and Fixed AP 702. Additionally for example, the Mobile AP 706 may communicate the collected sensor data to the Cloud 710 through the Mobile AP 707, Mobile AP 708, and Fixed AP 703. As discussed herein, any or all of the Mobile APs 730 may coordinate with each other regarding the collection of data from the sensor 709.

Various additional examples of various aspects of the present disclosure are shown at FIGS. 8-12.

Figure 8:
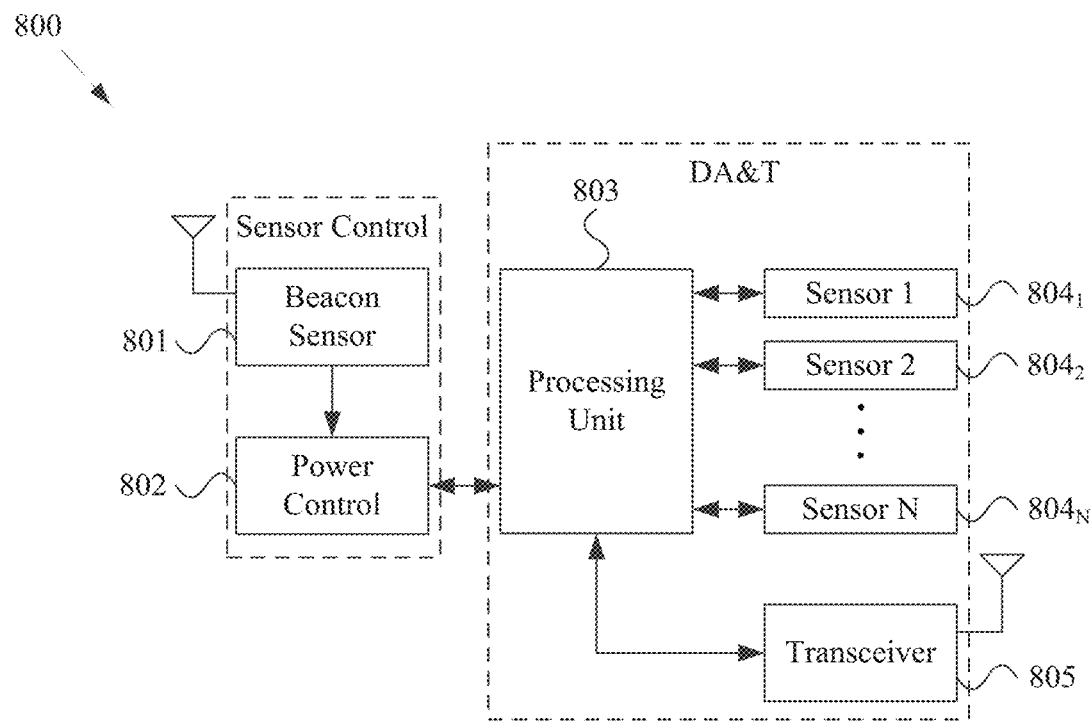
FIG. 8 shows a block diagram of an example sensor system, in accordance with various aspects of the present disclosure.

FIG. 8 shows a block diagram of an example sensor system 800, in accordance with various aspects of the present disclosure. The example system 800 may, for example, share any or all characteristics with the other example networks and/or network components 100, 200, 300, 400, 500-570, 600, 700, 900, 1000, 1100, and 1200, discussed herein.

The Beacon Sensor block (or module) 801 may, for example, operate to detect and/or receive an external signal (e.g., a wake or trigger signal, which may also be referred to herein as a beacon signal, a wake signal from a sensor, a wake signal from a user, etc.). The Power Control block (or module) 802 may, for example, operate to wake and sleep various electronic components of the sensor system 800. The Power Control block 802 may, for example, operate to turn on/off electrical power to various circuits, increase/decrease electrical voltage provided to various circuits, turn on/off clock signals to various circuits, increase/decrease clock signal frequency to various circuits, etc., based at least in part on signals received by the Beacon Sensor block 801. In general, the Beacon Sensor block 801 and Power Control block 802 may operate to perform or manage any or all of the sensor system 800 power-save functionality discussed herein.

Note that the Beacon Sensor block (or module) 801, the Power Control block (or module) 802, and/or any operational block (or module) discussed herein may, for example, be implemented in-whole or in-part by a processor operating in accordance with software instructions stored in a memory (e.g., a non-transitory memory, a non-volatile memory, a volatile memory, etc.). Also note that any or all of such operational blocks may be implemented in-whole or in-part utilizing an application-specific integrated circuit (ASIC), discrete logic components, any of a variety of passive or active electrical components, etc.

The example sensor system 800 comprises one or more sensors 804 that operate to provide information regarding any of a variety of sensed conditions, non-limiting examples of which are provided herein (e.g., light, weight, vibration, acceleration, position, orientation, gas, particle, sound, noise, temperature, humidity, moisture, pressure, touch, electromagnetic radiation, pollution, allergens, etc.). The Processing Unit 803 (e.g., a microprocessor, microcontroller, application-specific integrated circuit, digital signal processor, general logic circuitry, etc.) may, for example, operate under the control of power-save circuitry (e.g., the Beacon Sensor block 801, the Power Control block 802, etc.), but need not operate in a power-save mode. The Processing Unit block 803 may, for example, operate and/or interface with the Sensor(s) 804, for example determining whether and/or how to gather sensor data, communicate sensor data, etc. Also for example, the Processing Unit block 803 may operate to manage communication between the sensor system 800 and another entity, for example a Mobile AP. The Processing Unit 803 may, for example, utilize the Transceiver 805 (e.g., a Wi-Fi transceiver, etc.) to communicate with such other entity.

The elements of the example sensor system 800 may, for example, all be integrated into a single housing, distributed among a plurality of housings on a same object or at a same site, distributed among a plurality of housings at geographically distinct respective sites, etc.

The elements of the example sensor system 800 may also, for example, be grouped into various entities (e.g., units, subsystems, modules, etc.). For example, referring to FIG. 8, the example sensor system 800 may comprise various logical entities (or groups thereof). For example, a Sensor Control entity may comprise the Beacon Sensor block 801 and the Power Control block 802. Also for example, a Data Acquisition and Transmission (DA&T) entity may comprise the Processing Unit 803, the Sensor(s) 804, and the Transceiver 805.

The Sensor Control entity may, for example, be responsible for monitoring the environment and the detection of beacons (or wake signals, trigger signals, sensor signals, etc.) targeting or experienced by the sensor system 800. The Sensor Control entity may also store a last condition of the Data Acquisition and Transmission unit, where such information may be utilized to determine whether to wake-up the latter or not. In general, the Sensor Control entity may be configured to utilize very little power, thus being considered an ultra-low-power system. For example, the Sensor Control entity (e.g., the Beacon Sensor block 801 and/or the Power Control block 802) may operate while the rest of the system 900 is operated in a low-power mode (e.g., a sleep or deep sleep mode, etc.).

The DA&T entity may, for example, be responsible for the acquisition and transmission of data from the one or more sensors that may be part of the unit installation of the system 800. As discussed herein, such sensors may comprise any of a variety of characteristics. The DA&T entity may, for example be operated (or placed) in a semi-permanent deep sleep state until the Sensor Control entity wakes it to acquire and/or send the available data, when a scheduled data gathering action must be performed, etc. In this way the sensor system 800 may be operated with very-low power consumption, for example being operable with battery power or low-energy alternative energy sources, for an extended period of time.

Figure 9:
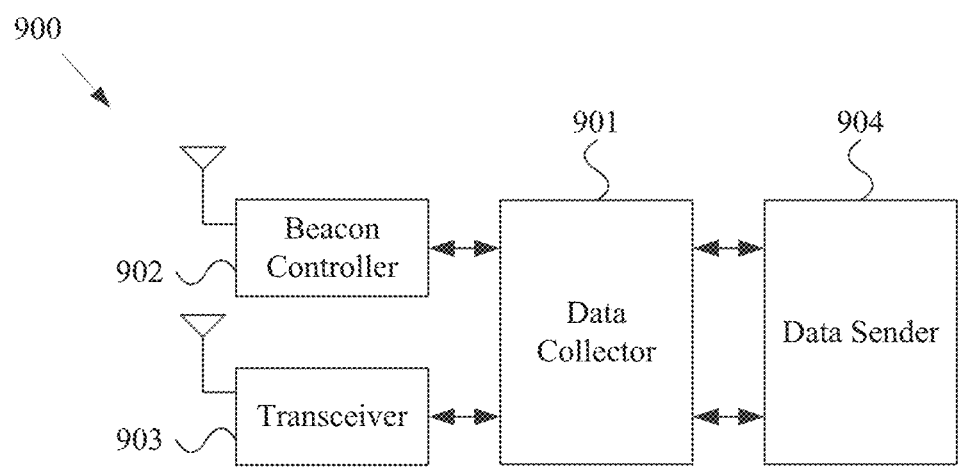
FIG. 9 shows a block diagram of an example AP system for interfacing with a sensor system, in accordance with various aspects of the present disclosure.

FIG. 9 shows a block diagram of an example AP system (e.g., a Mobile AP, Fixed AP, etc.) for interfacing with a sensor system, in accordance with various aspects of the present disclosure. The example system 900 may, for example, share any or all characteristics with the other example networks and/or network components 100, 200, 300, 400, 500-570, 600, 700, 800, 1000, 1100, and 1200 discussed herein.

The Beacon Controller block 902 (or module) may, for example, operate to perform functionality relating to determining whether to wake and/or interface with a sensor system. Many examples of such functionality are provided herein. The Transceiver 903 may, for example, operate to perform any or all of the communication functionality for the system 900 (e.g., communication with sensors, communication with other nodes of the network, etc.). The Data Collector block 901 (or module) may operate to collect, manage, and/or communicate sensor data. For example, the Data Collector block 901 may operate to implement any or all of the functionality discussed herein with regard to the collection, management, and/or communication of sensor data.

The Data Sender block 904 (or module), which may also be referred to herein as an Opportunistic Data Sender block 904 (or module), may operate to manage the communication of sensor data (e.g., raw sensor data, processed sensor data and/or metrics, etc.) to a destination (e.g., a Cloud server, a client server, a server of the network operator, etc.). In an example scenario, the Data Sender block 904 may operate to communicate delay-tolerant sensor information whenever relatively cheap communication pathways are available (e.g., via Wi-Fi hotspots, via other Mobile APs, when the Mobile AP is in a vehicle parked at a hub, etc.). In another example scenario, the Data Sender block 904 may also operate to utilize fast and reliable communication links (e.g., a cellular link) for the communication of time-sensitive sensor data. Note that even within a particular upload technology (e.g., utilizing a Wi-Fi hotspot, utilizing 802.11p, utilizing cellular, etc.) sensor data may be prioritized. The prioritization of data from various sensors may, for example, be static but may also be adjusted in real-time (e.g., in response to a present on-going test, in response to an emergency situation, in response to a potential network and/or vehicle anomaly, in response to a detected environmental condition, etc.). Many examples of sensor data communication are presented herein.

Note that the Beacon Controller block (or module) 902, the Transceiver block (or module) 903, the Data Collector block (or module) 901, the Opportunistic Data Sender block (or module) 904, and/or any operational block (or module) discussed herein may, for example, be implemented in-whole or in-part by a processor operating in accordance with software instructions stored in a memory (e.g., a non-transitory memory, a non-volatile memory, a volatile memory, etc.). Also note that any or all of such operational blocks may be implemented in-whole or in-part utilizing an application-specific integrated circuit (ASIC), discrete logic components, any of a variety of passive or active electrical components, etc.

The elements of the example AP system 900 may, for example, all be integrated into a single housing, distributed among a plurality of housings at a same site (e.g., in or on a same vehicle), distributed among a plurality of housings at geographically distinct respective sites, etc.

Figure 10:
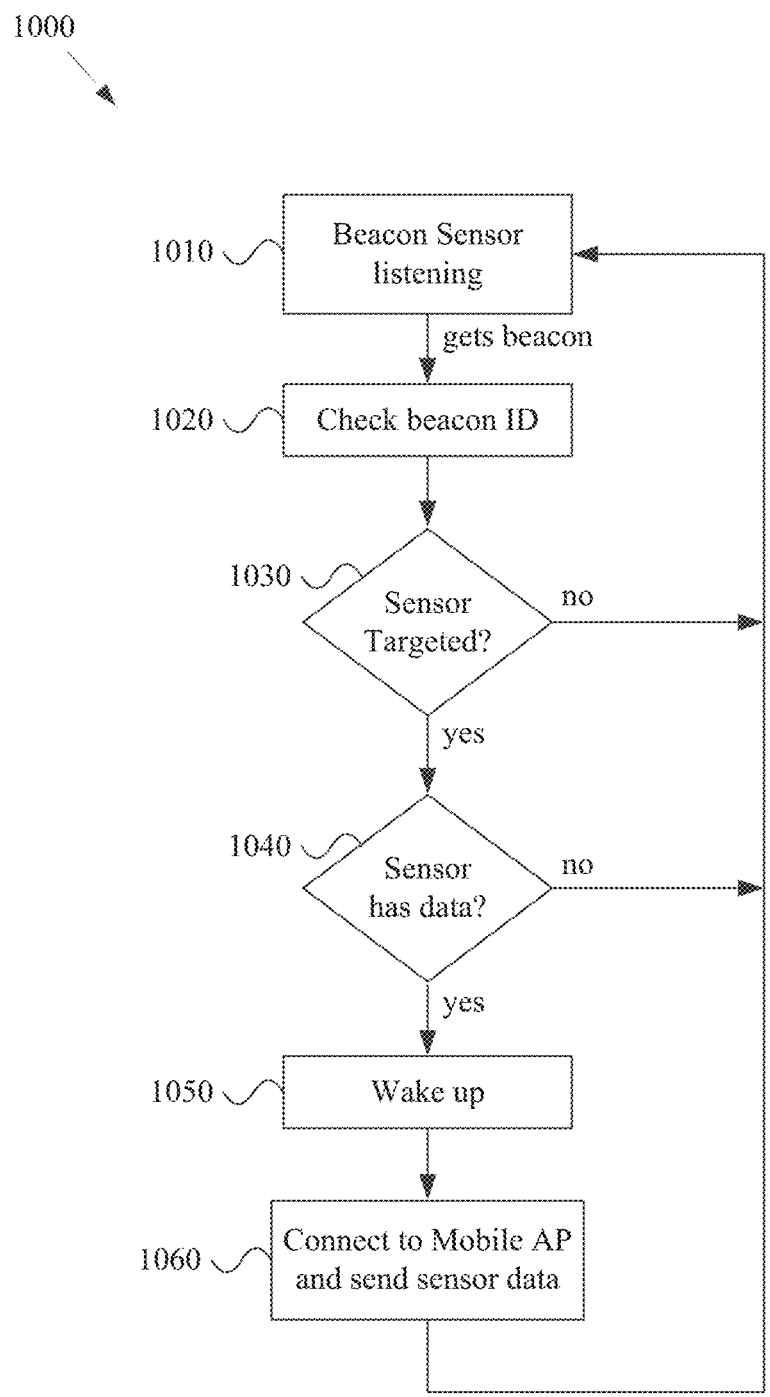
FIG. 10 shows a block diagram of an example method of operating a sensor system, in accordance with various aspects of the present disclosure.

FIG. 10 shows a block diagram of an example method 1000 of operating a sensor system, in accordance with various aspects of the present disclosure. The example method 1000 may, for example, share any or all characteristics with the other example networks and/or network components 100, 200, 300, 400, 500-570, 600, 700, 800, 900, 1100, and 1200, discussed herein. The method 1000 may be implemented by any of a variety of different types of sensor systems (e.g., the sensor system 800 of FIG. 8). Various aspects of the example method 1000 are discussed herein.

At block 1010, the example method 1000 may comprise listening for a signal (e.g., a beacon signal, a trigger signal, a wake signal, etc.), for example from a Mobile AP, from a Fixed AP, etc. Block 1010 may, for example, be performed by the Beacon Sensor block 801 of FIG. 8. The system may, for example, be in a sleep (or low-power) mode at this point. When a signal is received, execution of the example method 1000 may flow to block 1020. Note that, as discussed herein, any of a variety of other stimuli (e.g., sensor signals, commands, user inputs, timers, etc.) may also cause execution of the example method 1000 to flow to block 1020.

At block 1020, the example method 1000 may comprise analyzing the received signal, for example to determine whether the signal comprises characteristics that will trigger the sensor to perform an action (e.g., wake up, sense, communicate sensed data, communicate sensor control information, etc.). For example, the signal may comprise characteristics that identify the sensor, a group of sensors that includes the sensor, all sensors, etc. For example, the signal may be a unicast signal directed to only the sensor, a multicast signal directed to a group of sensors that includes the sensors, a broadcast signal directed to all sensors, etc. In an example scenario in which a Mobile AP maintains a list of sensors from which to collect data along the route of a vehicle carrying the Mobile AP, the signal may comprise characteristics (e.g., address information, etc.) directed to all sensors of the list of sensors from which data is to be collected. In another example scenario, the Mobile AP may sequentially unicast a signal to a respective next sensor as the vehicle carrying the Mobile AP along a route nears the respective next sensor. At block 1030, execution of the example method 1000 is directed back up to block 1010 if the received signal is not directed to the sensor, and is directed to block 1040 if the received signal is directed to the sensor.

At block 1040, the example method 1000 may comprise determining whether the sensor has data to communicate. If the sensor does not have data to communicate and it is not yet time to acquire such data, then execution flow of the method 1000 proceeds back up to block 1010. If, however, the sensor has data to communicate and/or the sensor is going to acquire the data, then execution flow of the example method 1000 proceeds to block 1050.

At block 1050, the sensor (or communication-related circuitry thereof) is wakened. As discussed herein, various circuitry of the sensor may be powered off, may be provided with a reduced current or voltage, may be provided with no clock signal or a reduced-frequency clock signal, etc. At block 1050, the sensor circuitry associated with communication of data gathered by the sensor is activated or restored to normal operating conditions. Note that various sensor circuitry may be awakened to perform the operations of blocks prior to block 1050 as needed. For example, at least a portion of the sensor circuitry may be activated (or restored to normal operating conditions) to perform the signal receiving, processing, and/or analyzing discussed herein.

At block 1060, the sensor establishes a communication link with the AP (e.g., Mobile AP, Fixed AP, etc.), for example the AP that sent the signal received at block 1010, and utilizes the communication link to communicate sensor data to the AP. Note that the sensor may also receive sensor control information of the communication link (e.g., information indicating how and when the sensor is to sense its environment, etc.).

At block 1060, after communication of the sensor data, the sensor may return to a sleep or low-power mode of operation, after which execution flow of the example method 1000 proceeds back up to block 1010 for continued operation.

Figure 11:
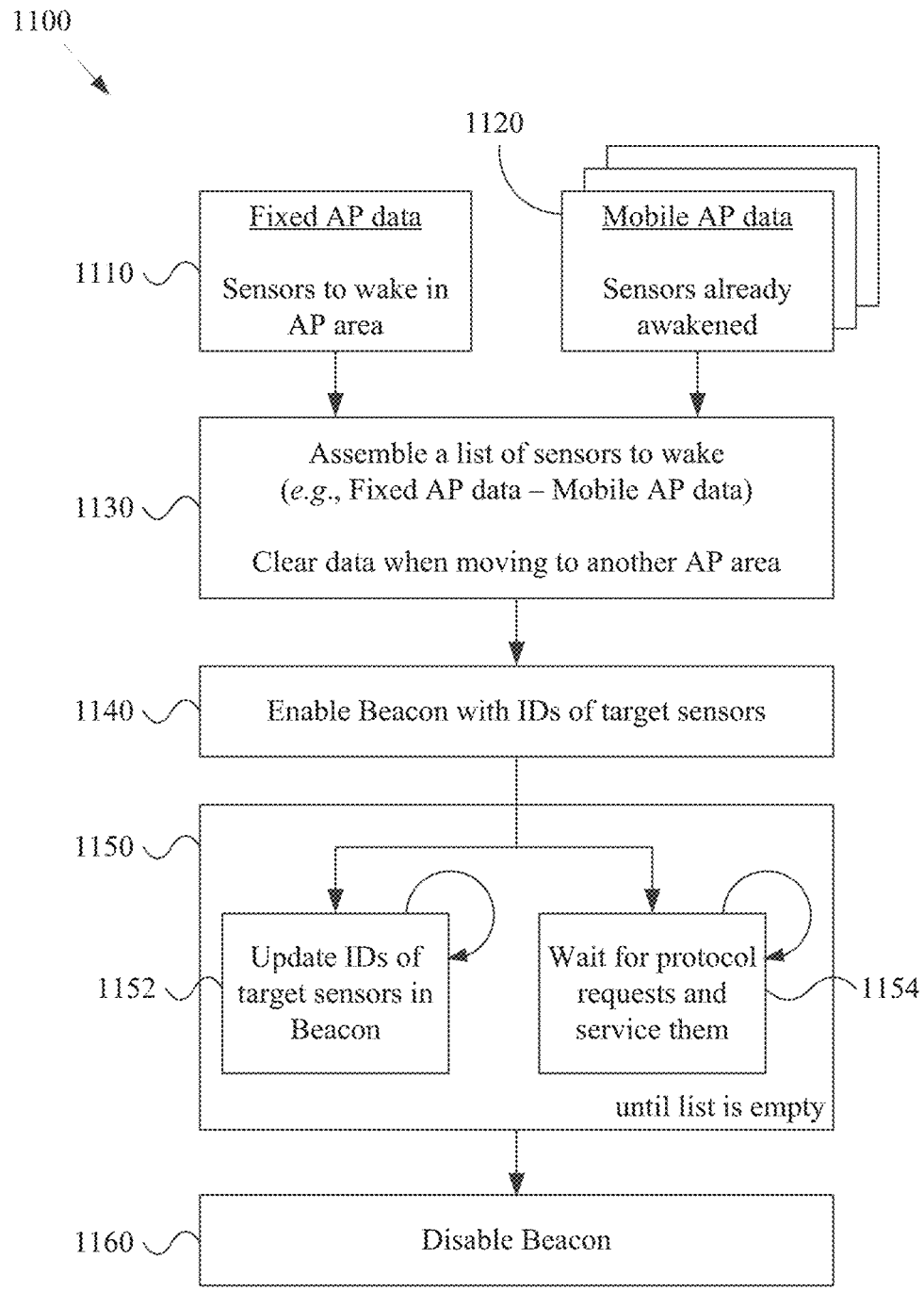
FIG. 11 shows a block diagram of an example method of gathering data from sensor systems, in accordance with various aspects of the present disclosure.

FIG. 11 shows a block diagram of an example method 1100 of gathering data from sensor systems, in accordance with various aspects of the present disclosure. The example method 1100 may, for example, share any or all characteristics with the other example networks and/or network components 100, 200, 300, 400, 500-570, 600, 700, 800, 900, 1000, and 1200, discussed herein. The method 1100 may be implemented by any of a variety of different types of systems (e.g., the AP or Mobile AP system 900 of FIG. 9, any of the network nodes discussed herein, etc.). Various aspects of the example method 1100 are discussed herein.

As discussed herein, the Cloud (e.g., one or more computing systems or servers thereof) may be generally aware of all of the sensors using the network. Such awareness may be propagated to the Fixed APs of the network, for example according to the geographical area covered by the Fixed AP, according to the geographical area covered by the Fixed AP plus an additional buffer region surrounding the covered geographical area, etc. For example, the Cloud may (e.g., in a solicited or unsolicited manner) provide a list of sensors within (or near) a Fixed AP's geographical area. Such a list of sensors may, for example, comprise a list of all sensors in the geographical area, a continually updated list of all of the sensors in the geographical area for which sensor data presently needs to be gathered, etc. An example of this is shown at block 1110 of FIG. 11.

The list of sensors may comprise any of a variety of characteristics. For example, as discussed herein, the list of sensors may include a list of all sensors within a geographical area associated with a Fixed AP. Also for example, the list of sensors may include a list of all sensors that a Mobile AP is expected to encounter while a vehicle (e.g., a public transportation vehicle, a delivery vehicle, etc.) carrying the Mobile AP traverses its designated route. Additionally for example, the list of sensors may comprise geographical location information for each sensor. The list of sensors may, for example, be organized in an order corresponding to the order in which the Mobile AP is expected to encounter the sensors. Further for example, as discussed herein, the list of sensors may comprise information (e.g., for each sensor or group thereof) that indicates the manner (e.g., communication network, protocol, maximum acceptable latency, etc.) in which data collected from the sensors is to be communicated.

While traveling through the geographical region, a Mobile AP may obtain the list of sensors. As the Mobile AP gathers data from the listed sensors, the Mobile AP may indicate to the other Mobile APs and/or the Fixed AP that the data has been gathered. Similarly, the Mobile AP may receive information regarding the collection of such data from other Mobile APs (or APs in general). An example of this is shown at block 1120 of FIG. 11.

At block 1130 of the example method 1100, the Mobile AP maintains the list of sensors (some or all of which may need to be awakened during the collection process). For example, the Mobile AP may begin with a full list of the sensors in a Fixed AP's geographical location and/or a list of those sensors from which data needs to be gathered, and then the Mobile AP may subtract from the list (or at least designate or flag) those sensors from which the data has been gathered by the Mobile AP and/or other Mobile APs. Note that when the Mobile AP then travels to another Fixed AP's geographical area, the Mobile AP may receive a new list from such other Fixed AP. In an alternative scenario, a Mobile AP may be provided with a list of all sensors to be encountered during an expected route of a vehicle carrying the Mobile AP, where such route may encompass geographical areas associated with a plurality of Fixed APs.

At block 1140 of the example method 1100, the Mobile AP may form a signal (e.g., a beacon signal, trigger signal, wake signal, etc.) that identifies one or more target sensors. As discussed herein, the signal may comprise characteristics (e.g., address data, other data, various signal features, etc.) that identify a single sensor, a group of sensors, any sensor that hears the signal, etc. For example, the signal may comprise characteristics that identify all sensors within the geographical area of the Fixed AP, that identify all sensors within the geographical area of the Fixed AP from which data presently needs to be collected (or gathered), that sequentially identifies only a next sensor (or group thereof), for example as a function of vehicle location, as the vehicle carrying the Mobile AP traverses its route, etc.

At block 1150 of the example method 1100, the Mobile AP may concurrently or simultaneously collect sensor data from the sensors (e.g., at block 1154), and update the list of sensors and/or the sensors identified in the signal (e.g., at block 1152) as data is collected from the sensors by the Mobile AP and/or other Mobile APs. The Mobile AP may, for example, continue the sensor data collecting and list/signal maintaining until the sensor data is collected from all of the sensors on the list and/or until the Mobile AP leaves the geographical area. In an example implementation, the Fixed AP, Cloud computing system or server or central controller, etc., may maintain a master list of sensors from which data needs to be collected and from which data has already been collected. Updated information from the master list may continually be propagated to the Mobile APs and/or Fixed APs. Additionally, some or all of the sensors may locally maintain information as to whether their respective sensor data has been collected (e.g., notifying a Mobile AP soliciting the sensor's data that such data has already been collected, has already been collected a target number of times, etc.).

As data is collected from the sensors (e.g., at block 1154, etc.), the Mobile AP may determine a manner in which to communicate the collected sensor data (e.g., to a Cloud computing system, server, central controller, client, etc.). As discussed herein, the Mobile AP may communicate the collected sensor data in any of a variety of manners (e.g., via the vehicular communication network, via a cellular communication network, via a Wi-Fi hotspot, etc.). In an example implementation, the list of sensors may include (e.g., in a record for each sensor) an indication of the manner in which the Mobile AP is to communicate the collected sensor data. For example, the list of sensors may indicate that sensor data from a first sensor (or first sensor type) is delay-tolerant and is to always be communicated in an opportunistic manner when a Wi-Fi hotspot with Internet access is available, when a vehicle returns to a hub at the end of a shift, etc. Also for example, the list of sensors may indicate that data from a second sensor is to be communicated in an opportunistic manner when a Wi-Fi hotspot with Internet access is available, unless the sensor data warrants a different manner. For example, sensor data from a garbage can sensor that indicates no garbage collection service is needed may be communicated opportunistically, while sensor data from the same sensor that indicates garbage collection service is urgently needed may be communicated to a waste management client through the vehicle communication network as soon as possible. As another example, sensor data from a pollution particle sensor that exceeds a level at which a health warning should be issued may be communicated immediately using a cellular network, while sensor data from such sensor that indicates pollution is at a normal level may be communicated in a delay-tolerant manner.

In an example implementation, sensor data may be prioritized (e.g., within the list of sensors, by the Mobile AP as sensor data is analyzed, etc.). For example, data from a first type of sensor (e.g., a sensor related to accident detection, emergency services, etc.) may be assigned a relatively high priority, data from a second type of sensor (e.g., a sensor related to traffic management, pollution control, etc.) may be assigned a relatively moderate priority, and data from a third type of sensor (e.g., a sensor related to waste management, potential needed road repairs, etc.) may be assigned a relatively low priority. The Mobile AP may then communicate the collected sensor data in accordance with its priority. For example, the Mobile AP may place higher priority data at the top of a communication queue. Also for example, the Mobile AP may communicate sensor data with different respective priorities in different respective manners (e.g., high-priority data through a cellular network, moderate-priority data through the vehicle network, low-priority data through a Wi-Fi network when available and/or at the vehicle hub when the vehicle has completed its route or shift, etc.).

At block 1160, for example after the Mobile AP is finished collecting the sensor data from the listed sensors, the Mobile AP may disable or discontinue transmission of the signal (e.g., the beacon signal, trigger signal, wake signal, etc.).

Figure 12:
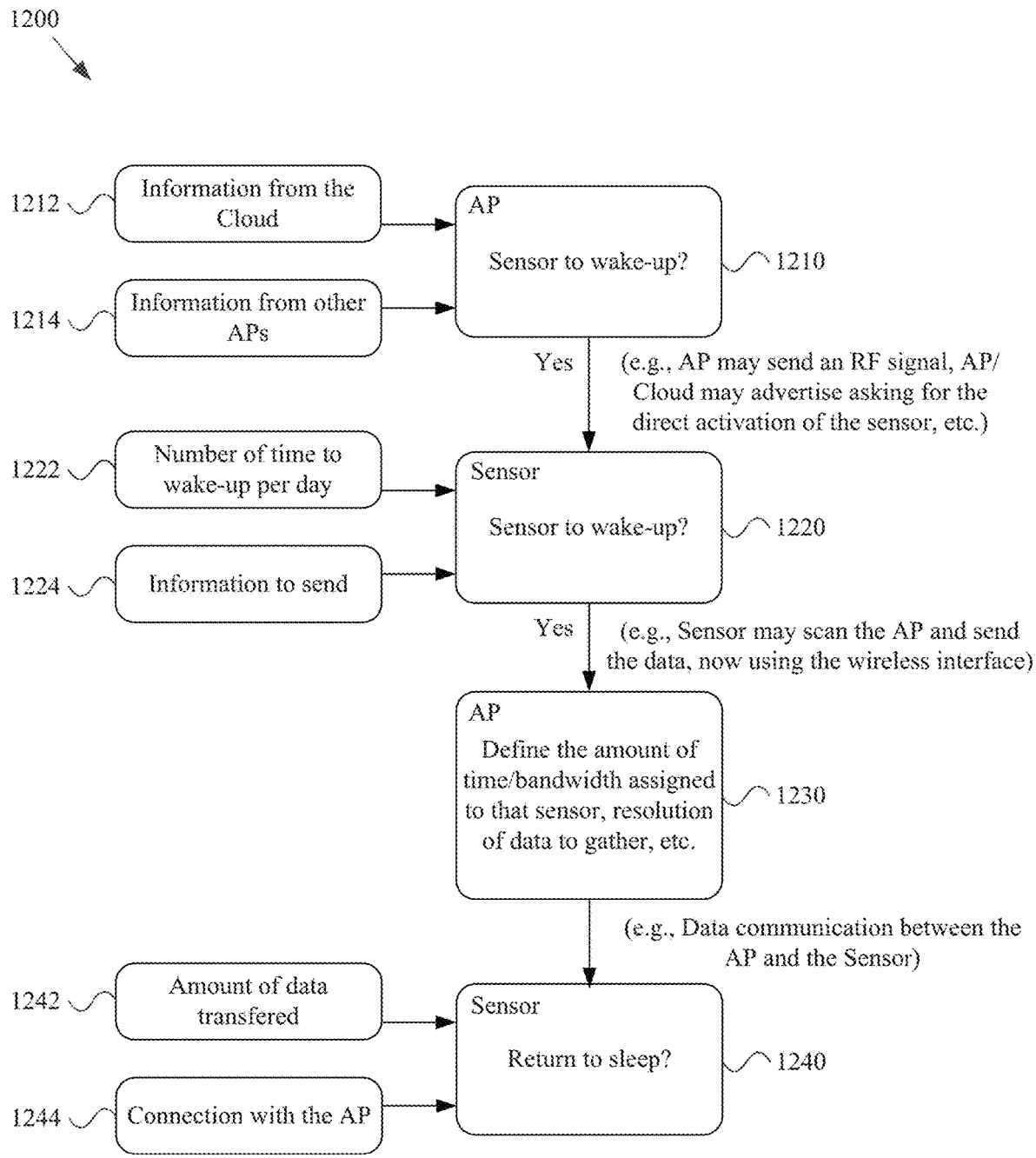
FIG. 12 shows a block diagram of an example method of operating a sensor system and network, in accordance with various aspects of the present disclosure.

FIG. 12 shows a block diagram of an example method 1200 of operating a sensor system and network, in accordance with various aspects of the present disclosure. The example method 1200 may, for example, share any or all characteristics with the other example networks and/or network components 100, 200, 300, 400, 500-570, 600, 700, 800, 900, 1000, and 1100, discussed herein. The method 1200, or portions thereof, may be implemented by any of a variety of different types of network components (e.g., sensor systems, for example the example sensor system 800 of FIG. 8, AP systems, for example the example AP system 900 of FIG. 9, Cloud systems, etc.). Various aspects of the example method 1200 are discussed herein. In an example implementation, the example method 1200 may share any or all AP-related characteristics with the example method 1100 of FIG. 11, and share any or all sensor-related characteristics with the example method 1000 of FIG. 10.

In accordance with various aspects of this disclosure, with Fixed APs continuously connected to the Cloud, an arbitration mechanism that ultimately causes a Mobile AP to decide whether to wake-up a sensor, may be utilized, for example to optimize the performance of the data collection and the expected lifetime of sensors.

Also in accordance with various aspects of this disclosure, various authentication mechanisms are also included in the network, non-limiting characteristics of which are discussed herein. The Cloud may thus be aware of all the sensors using the network, and may otherwise grant or deny access to their respective data. Such sensor system awareness may be leveraged to decide if a sensor should be wakened to acquire data. For example, given the geographical area of a Fixed AP, the AP can request the Cloud (e.g., a computing system or server thereof) to send it a list of sensors within the Fixed AP's geographical area, which may then be propagated to the Mobile APs passing near the Fixed AP. An example of this is illustrated at FIG. 11 at item 1110. Also for example, the Cloud may propagate such information to the Fixed AP in an unsolicited manner, for example when such information changes and the information previously propagated to the Fixed AP needs to be updated.

With Fixed APs regularly reachable, a Mobile AP can readily obtain a list of sensors that should be awakened, and/or from which sensor data needs to be collected. After obtaining such a list (e.g., which may be obtained as part of a push or pull system, solicited or unsolicited) and when traveling in the area, the Mobile AP may gather data from sensors of the list of sensors, registering the sensors from which data was obtained, and propagating that registration information among neighbor Mobile APs and Fixed APs, for example to prevent those sensors from being awakened again until needed. Note that the propagation of such information may occur bi-directionally through the Mobile/Fixed AP mesh network. An example of such operation is shown at FIG. 11 at blocks 1120 and 1130.

The wake frequency of a sensor, among other configuration parameters (e.g., timing, triggers, codes, sensor or data priority, sensor data resolution, etc.), may be stored in the Cloud. Such storage for example may provide ready access to such information (e.g., by the Fixed APs, etc.) and provide for such information to be readily configurable through the Cloud.

In an example implementation, a sensor wake process may comprise four phases. In the first phase, the Mobile AP decides to wake the sensor (e.g., based on information received from Fixed APs, information received from surrounding Mobile APs, information regarding prior sensor interaction, etc.). Non-limiting examples of this first phase are shown at FIG. 11, blocks 1110-1130 and at blocks 1210-1214 of FIG. 12.

In the second phase (e.g., a Beacon transmission phase), the Mobile AP sends (e.g., broadcasts, multicasts, unicasts, etc.) a signal (e.g., a beacon signal, a trigger signal, a wake signal, etc.) comprising information with the target sensor's address (or a plurality thereof) or some other signal characteristic that will trigger (or wake) the target sensor. The Mobile AP may, for example, start the beaconing process targeting specific sensors using an addressing scheme. Non-limiting examples of this second phase are shown at FIG. 11, blocks 1140-1150, and FIG. 12, block 1210.

In the third phase (e.g., a Beacon identification phase), the sensor, equipped with a Beacon Sensor (e.g., as shown at the Beacon Sensor block 801 of FIG. 8), detects the beacon and determines whether the beacon is directed to the sensor (e.g., addressed to the sensor, comprising some signal characteristic that is indicative of the sensor, etc.). The Beacon Sensor may, for example, provide various filters to filter out (or ignore) signals that are of no concern to the sensor. Non-limiting examples of this third phase are shown at FIG. 10, blocks 1010-1030, and FIG. 12, blocks 1220-1224.

In the fourth phase (e.g., a Wake-up call phase), when a sensor is targeted, and if there is data available to upload to the network, then the sensor wakes to transfer its data (and/or perform real-time sensing) to the Mobile AP. Non-limiting examples of this phase are shown at FIG. 10, blocks 1040-1060, and FIG. 12, blocks 1230-1240.

As the Mobile AP decides to wake-up a sensor or a cluster of sensors in a given region, the Mobile AP broadcasts a signal (e.g., a beacon signal, trigger signal, wake signal, etc.) that is recognized by the sensors as the trigger to upload their stored data, and/or to acquire data and then to upload the acquired data. As explained herein, this beacon signal may comprise any of a variety of characteristics that may be analyzed by a low-power circuit in the sensors to determine whether to wake the sensor. At block 1220, the sensor determines whether to wake up. Note, however, that not all sensors need operate in a sleep mode. For example, some sensors may be fully awake and fully operational at all times.

Upon receiving a signal (e.g., a beacon signal, trigger signal, wake signal, etc.) directed to it, the sensor system may take sensor readings if necessary and then transfer data of the sensor measurements (e.g., current measurements, stored prior measurements, etc.) to the Mobile AP, for example using a low-power communication protocol (e.g., a modified Constrain Application Protocol (CoAP) implementation, etc.). In an example scenario, a modified CoAP implementation may, for example, allow the information transfer to be authenticated to guarantee that the sensor is a genuine and authorized device. This authentication may, for example, be token-based and backed up by service classification. Thus, in such an example implementation, only a sensor system (or device) with a matching pair token+service ID may enter the transport network and upload its sensor data to the Cloud.

Depending on the protocol utilized (e.g., the CoAP protocol, a modified CoAP protocol, etc.) session establishment may be avoided, resulting in a reduced time to deliver the sensor data to the Mobile AP. For example, when a sensor system (or device or unit) senses the presence of a Mobile AP (e.g., by detecting a beacon signal directed to the sensor system or some other event), the sensor may send the data, which is then accepted or denied by the recipient. Thus, almost every packet exchanged between the Mobile AP and the sensor system may data packets, resulting in low control overhead.

Regarding security, a protocol implementation such as CoAP may benefit from DTLS to guarantee data security and privacy for sensitive sensor data. Additionally, in security-conscious implementations, for example where the cost is justified, the sensor data may be encrypted end-to-end between the sensor and a Cloud application.

In general, the utilization of a CoAP-like protocol facilitates fast, reliable and secure data transfers without the need for high-power processing. The customization of the transmission parameters is also beneficial, for example facilitating the modification of transmission type in order to get the best compromise between speed and reliability for the desired applications.

In accordance with various aspects of the present disclosure, sensor operation may be configurable with a configuration file downloaded via the Mobile AP. For example, various configurable parameters (e.g., specifying when or how often a sensor should sense its environment independent of Mobile AP proximity, the triggering conditions for sensor sensing or communication, when the sensor should ignore wake signals, etc.) may be communicated to the sensor in a file or other data structure. Additionally for example, as with the Mobile AP, the sensor systems may also receive software upgrades from the cloud (e.g., via a Mobile AP).

A network or system implemented in accordance with various aspects of the present disclosure provides many benefits. For example, the deployment of sensors of many different types is low-cost, sensor maintenance is low-cost, data collection from the sensors is low-cost, sensor reliability and longevity is high, etc. Also for example, the rich network environment for sensor data collection enables the analysis of many sensed characteristics, the analysis of which was previously cost-prohibitive.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of Mobile Access Points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of Fixed Access Points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of Mobile Access Points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of Mobile Access Points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide systems and methods for collecting data in a network of moving things. As non-limiting examples, various aspects of this disclosure provide systems and methods for operating sensor systems and collecting data from sensor systems in a power-efficient and network-efficient manner. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A communication network mobile access point (MAP) comprising:
   a plurality of wireless transceivers operable to provide wireless communication between the MAP and a vehicle communication network, and to provide wireless local area network (WLAN) access point services; and
   at least one module comprising a processor and memory, wherein the at least one module is operable to, at least:
      receive a list of sensors from which the MAP is to collect sensor data while the MAP travels along an expected travel route, where the sensors are independent of fixed and mobile access points; and
      while the MAP is traveling along the expected travel route:
         utilize a first wireless transceiver of the plurality of wireless transceivers to provide WLAN access point services to a client device; and
         as the MAP travels within wireless communication range of a first in-range sensor of the received list of sensors:
            transmit a first signal comprising first characteristics to wake the first in-range sensor from a sleep mode;
            utilize the first wireless transceiver to establish a first wireless communication link with the first in-range sensor;
            collect sensor data from the first in-range sensor over the first wireless communication link;
            select a manner of a plurality of manners in which to communicate the collected sensor data to a destination, by at least in part operating to:
               select a communication network for communicating the collected sensor data;
               select a communication protocol for communicating the collected sensor data; and/or
               select whether to communicate the collected sensor data immediately or in an opportunistic manner; and
            communicate the collected sensor data to the destination in the selected manner.

2. The MAP of claim 1, wherein the at least one module is operable to, prior to said establish the first wireless communication link with the first in-range sensor:
   identify a location of the MAP; and
   identify said first in-range sensor based, at least in part, on the identified location of the MAP.

3. The MAP of claim 1, wherein the list of sensors comprises information indicating the first characteristics of the first signal to wake the first in-range sensor.

4. The MAP of claim 1, wherein:
   the list of sensors comprises information indicating, for each sensor of the list of sensors, a respective communication network to utilize to communicate respective data collected from said each sensor; and
   the selected manner comprises utilizing the respective communication network listed for the first in-range sensor.

5. A communication network mobile access point (MAP) comprising:
   a plurality of wireless transceivers operable to provide wireless communication between the MAP and a vehicle communication network, and to provide wireless local area network (WLAN) access point services; and
   at least one module comprising a processor and memory, wherein the at least one module is operable to, at least:
      receive a list of sensors from which the MAP is to collect sensor data while the MAP travels along an expected travel route; and
      while the MAP is traveling along the expected travel route:
         utilize a first wireless transceiver of the plurality of wireless transceivers to provide WLAN access point services to a client device; and
         as the MAP travels within wireless communication range of a first in-range sensor of the received list of sensors:
            utilize the first wireless transceiver to establish a first wireless communication link with the first in-range sensor;
            collect sensor data from the first in-range sensor over the first wireless communication link;
            select a manner of a plurality of manners in which to communicate the collected sensor data to a destination, by at least in part operating to:
               select a communication network for communicating the collected sensor data;
               select a communication protocol for communicating the collected sensor data; and/or
               select whether to communicate the collected sensor data immediately or in an opportunistic manner; and
            communicate the collected sensor data to the destination in the selected manner.

6. The MAP of claim 5, wherein the at least one module is operable to, prior to said establish the first wireless communication link with the first in-range sensor:
   identify a location of the MAP; and
   identify said first in-range sensor based, at least in part, on the identified location of the MAP.

7. The MAP of claim 5, wherein:
   the list of sensors comprises information indicating, for each sensor of the list of sensors, a respective communication network to utilize to communicate respective data collected from said each sensor; and
   the selected manner comprises utilizing the respective communication network listed for the first in-range sensor.

8. The MAP of claim 5, wherein:
   the list of sensors comprises:
      first information indicating that sensor data collected from the first in-range sensor of the list of sensors is always to be communicated in an opportunistic manner; and
      second information indicating that sensor data collected from a second sensor of the list of sensors is to be communicated in an opportunistic manner unless the sensor data collected from the second sensor warrants immediate communication; and
   the selected manner comprises communicating the collected sensor data in an opportunistic manner.

9. The MAP of claim 5, wherein the at least one module is operable to determine to communicate the collected sensor data when the MAP is within range of an available Wi-Fi hotspot.

10. The MAP of claim 5, wherein:
the list of sensors prioritizes the first in-range sensor over a second sensor; and
the at least one module is operable to prioritize communication of the collected sensor data relative to communication of sensor data collected from the second sensor.

11. The MAP of claim 5, wherein the at least one module is operable to determine the manner in which to communicate the collected sensor data based, at least in part, on the identity of the first in-range sensor.

12. The MAP of claim 5, wherein the at least one module is operable to select the manner by, at least in part, operating to determine whether to communicate the collected sensor data immediately or in an opportunistic manner based, at least in part, on a value of the collected sensor data.

13. The MAP of claim 5, wherein the at least one module is operable to determine to communicate the collected sensor data utilizing a selected one of a plurality of selectable communication networks.

14. The MAP of claim 1, wherein the received list of sensors originates at a central controller and comprises information identifying sensors within a particular geographic area in which the MAP is expected to travel.

15. The MAP of claim 1, wherein the first signal comprises characteristics that identify a particular sensor and/or a group of sensors of the list of sensors.

16. A communication network mobile access point (MAP) comprising:
a plurality of wireless transceivers operable to provide wireless communication between the MAP and a vehicle communication network, and to provide wireless local area network (WLAN) access point services; and
at least one module comprising a processor and memory, wherein the at least one module is operable to, at least:
receive a list of sensors from which the MAP is to collect sensor data while the MAP travels along an expected travel route; and
while the MAP is traveling along the expected travel route:
utilize a first wireless transceiver of the plurality of wireless transceivers to provide WLAN access point services to a client device; and
as the MAP travels within wireless communication range of a first in-range sensor of the received list of sensors:
transmit a first signal comprising first characteristics to wake the first in-range sensor from a sleep mode;
utilize the first wireless transceiver to establish a first wireless communication link with the first in-range sensor;
collect sensor data from the first in-range sensor over the first wireless communication link;
select a manner of a plurality of manners in which to communicate the collected sensor data to a destination, by at least in part operating to:
select a communication network for communicating the collected sensor data;
select a communication protocol for communicating the collected sensor data; and/or
select whether to communicate the collected sensor data immediately or in an opportunistic manner; and
communicate the collected sensor data to the destination in the selected manner, wherein:
the list of sensors comprises first sensor location information for the first in-range sensor;
the list of sensors comprises first sensor wake-up signal information for the first in-range sensor; and
the at least one module is operable to, while the MAP is traveling along the expected travel route and prior to said establish the first wireless communication link with the first in-range sensor:
determine a location of the MAP;
identify, based at least in part on the determined location of the MAP and on the first sensor location information of the list of sensors, the first in-range sensor;
determine, based at least in part on the first sensor wake-up information of the list of sensors, the first characteristics of the first signal that will wake the first in-range sensor from a sleep mode; and
utilize the first wireless transceiver to transmit the first signal comprising the first characteristics to wake the first in-range sensor from the sleep mode.

* * * * *